US012620400B2

(12) United States Patent
Malik et al.

(10) Patent No.: US 12,620,400 B2
(45) Date of Patent: May 5, 2026

(54) DETECTION AND SUPPRESSION OF HOWL SPEECH SIGNAL

(71) Applicant: Meta Platforms Technologies, LLC, Menlo Park, CA (US)

(72) Inventors: Sarmad Aziz Malik, Redmond, WA (US); Syavosh Zadissa, Bothell, WA (US); Xiaofei Chen, San Diego, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 688 days.

(21) Appl. No.: 18/086,555

(22) Filed: Dec. 21, 2022

(65) Prior Publication Data

US 2024/0096340 A1 Mar. 21, 2024

Related U.S. Application Data

(60) Provisional application No. 63/357,495, filed on Jun. 30, 2022.

(51) Int. Cl.
*G10L 21/02* (2013.01)

(52) U.S. Cl.
CPC .................................... *G10L 21/02* (2013.01)

(58) Field of Classification Search
CPC ................. G10L 21/02; G10L 21/0232; G10L 2021/02082; G02C 11/06; H04R 3/02; H04R 5/033; H04R 5/0335; G10K 2210/506; G10K 11/17819; G10K 11/17875; G10K 11/17879
See application file for complete search history.

(56) References Cited

U.S. PATENT DOCUMENTS

| | | | | |
|---|---|---|---|---|
| 7,227,959 B2 * | 6/2007 | Abraham | ............... | H04R 3/005 381/83 |
| 8,180,070 B2 | 5/2012 | Tatsumi | | |
| 9,002,029 B2 | 4/2015 | Tanaka | | |
| 9,036,829 B2 | 5/2015 | Lee | | |
| 10,178,486 B2 | 1/2019 | Yuan et al. | | |
| 10,938,992 B1 * | 3/2021 | Truong | ................. | H04M 3/568 |
| 2011/0206226 A1 * | 8/2011 | Pandey | ................ | H04R 25/453 381/317 |

(Continued)

OTHER PUBLICATIONS

Leotwassana W., et al., "Adaptive Howling Canceller Using Adaptive IIR Notch Filter: Simulation and Implimentation," IEEE International Conference on Neural Networks and Signal Processing, Dec. 14-17, 2003, pp. 848-851.

*Primary Examiner* — Xu Mei
(74) *Attorney, Agent, or Firm* — Greenberg Traurig, LLP

(57) ABSTRACT

A system suppresses howl in a device including microphones and speakers, for example, an artificial reality headset. A speaker of the device presents audio content. The audio content presented by the speaker is received by a microphone of the device thereby creating a howl in certain situations. The system detects the presence of the howl in a region of the audio content using an adaptive notch filter. The system suppresses the howl by reducing gain of one or more frequencies of the audio content. The system may detect presence of the howl by monitoring flatness of the signal. The system may detect presence of the howl based on tonality detection based on linear prediction.

20 Claims, 11 Drawing Sheets

(56) References Cited

U.S. PATENT DOCUMENTS

| | | | | |
|---|---|---|---|---|
| 2011/0216910 | A1* | 9/2011 | Lee | H04R 3/02 381/71.8 |
| 2013/0272533 | A1* | 10/2013 | Kojima | H04R 3/02 381/66 |
| 2014/0192993 | A1* | 7/2014 | Mikami | H04R 3/02 381/71.4 |
| 2019/0043467 | A1* | 2/2019 | Zhou | G10L 25/51 |
| 2023/0044336 | A1* | 2/2023 | Schreibman | G10L 21/0232 |
| 2024/0121554 | A1* | 4/2024 | Furukawa | H04R 3/04 |

* cited by examiner

800

DETECTION AND SUPPRESSION OF HOWL SPEECH SIGNAL

CROSS-REFERENCE TO RELATED APPLICATIONS

This application claims the benefit of U.S. Provisional Application No. 63/357,495, filed on Jun. 30, 2022, which is incorporated by reference in its entirety.

FIELD OF THE INVENTION

This disclosure relates generally to speech signal processing, and more specifically to a detection and suppression of howling speech signal in devices.

BACKGROUND

Howl or howling speech signal is formed when there is audio feedback such that an acoustic path exists between an audio input (e.g., microphone) and an audio output (e.g., speaker). For example, a signal received by a microphone is amplified and output by the speaker, and the sound from the loudspeaker again is received by the microphone, amplified, and output by the loudspeaker, and so on. As a result, the system forms a positive feedback loop that results in a howl. The frequency of the resulting howl depends on various factors such as the resonance frequencies of the microphone, amplifier, and speaker. Howl is a problem in conventional wearable devices that include a microphone and speaker that are close to each other. Howl significantly degrades the sound quality of the device and creates a sound that is uncomfortable to the user wearing the device and provides poor user experience. A system may use adaptive feedback cancellers (AFCs) to mitigate howl. However, AFCs only provide stability in a steady state. In the presence of path changes and/or other system variations, an AFC fails to react fast enough to effectively suppress howl.

SUMMARY

A system, for example, an audio system suppresses howl in a device including microphones and speakers. A speaker of the device presents audio content. The audio content presented by the speaker is received by at least a microphone of the device. This may create a positive feedback loop resulting in a howl. The system detects the presence of the howl in a region of the audio content using an adaptive notch filter. The system suppresses the howl by reducing gain of one or more frequencies of the audio content.

According to an embodiment, the system detects presence of the howl by monitoring flatness of the signal. If the system detects more than a threshold flatness of signal, the system determines that howl is present. The system may suppress the howl further by reducing the gain of the one or more frequencies of the audio content and keeping the gain low for at least a threshold amount of time thereby eliminating the howl. Once the howl is eliminated, the system may increase gain for the one or more frequencies again to provide better quality sound.

According to an embodiment, the adaptive notch filter is one of multiple adaptive notch filters. The audio content includes signals of multiple frequency ranges. Each adaptive notch filter is associated with a frequency range such that the adaptive notch filter that detects the howl is associated with a particular frequency range. The audio system reduces gain of frequencies of the particular frequency range to reduce the howl. Thereby the system does not reduce gain of all frequencies.

According to an embodiment, the system detects presence of the howl based on tonality detection based on linear prediction.

According to an embodiment, the device is an artificial reality headset.

Embodiments include methods for howl suppression as described herein, systems such as audio systems that implement the methods and computer readable non-transitory storage systems that store instructions for causing a computer system to perform steps of the methods disclosed herein.

Figure 1A:
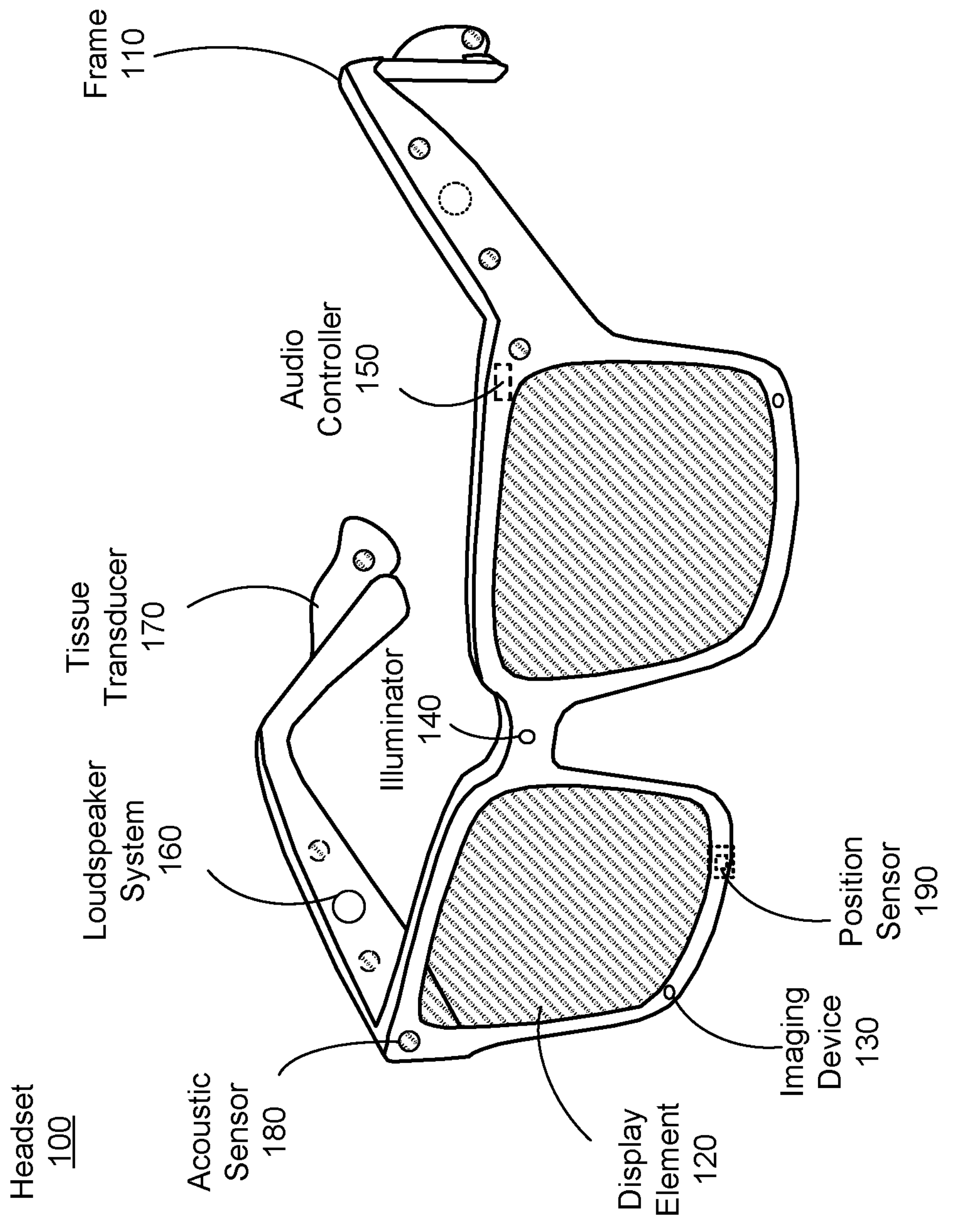
FIG. 1A is a perspective view of a headset 100 implemented as an eyewear device, in accordance with one or more embodiments.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

Overview

Disclosed herein is a system, for example, an audio system for effective howl detection and suppression. The audio system may be integrated into a wearable device (e.g., headset) that includes a sensor array, a speaker array, and a controller. In some embodiments, the device may be, e.g., a headset, in-ear devices, some other device, or some combination thereof. The system includes a feedback path between the sensory array and the speaker array through which howl may occur. The system monitors for howl and suppresses it as described herein.

The system may detect and suppress howl, by processing in the time domain or in the frequency domain. The system uses a combination of tonality and level (or gain) as indicators of howl in an audio signal. If a coherence function is used for tonal detection, there can be a lot of noise. The system according to various embodiments uses linear prediction for tonal detection. Linear predication results in significantly less noise compared to embodiments that use the coherence function.

The system monitors sound from the microphone array to estimate whether howl is present. Alternatively, or in addition to, the system may monitor the audio signal going to the speakers to estimate whether howl is present. The system may use predictive linear filtering based on all-pole notch-filter model to determine one or more regions of howl in an audio signal. In some embodiments, the system monitors a flatness of the audio signal in frequency, and in regions where a jitter is above a threshold value, the system determines that a howl event is occurring at those regions.

Responsive to detecting howl, the system suppresses the detected howl. In some embodiments, the system places a corresponding notch filter over the determined one or more regions, such that frequencies associated with those regions (i.e., howl) are suppressed with minimal effect on frequencies outside of the one or more notch filters. In other embodiments, the system may globally reduce a gain of the audio signal until howl is no longer detected. Embodiments may be included in or implemented in conjunction with an artificial reality system.

Artificial Reality Implementations

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to create content in an artificial reality and/or are otherwise used in an artificial reality. The artificial reality system that provides the artificial reality content may be implemented on various platforms, including a wearable device (e.g., headset) connected to a host computer system, a standalone wearable device (e.g., headset), a mobile device or computing system, or any other hardware platform capable of providing artificial reality content to one or more viewers.

FIG. 1A is a perspective view of a headset 100 implemented as an eyewear device, in accordance with one or more embodiments. In some embodiments, the eyewear device is a near eye display (NED). In general, the headset 100 may be worn on the face of a user such that content (e.g., media content) is presented using a display assembly and/or an audio system. However, the headset 100 may also be used such that media content is presented to a user in a different manner. Examples of media content presented by the headset 100 include one or more images, video, audio, or some combination thereof. The headset 100 includes a frame, and may include, among other components, a display assembly including one or more display elements 120, a depth camera assembly (DCA), an audio system, and a position sensor 190. While FIG. 1A illustrates the components of the headset 100 in example locations on the headset 100, the components may be located elsewhere on the headset 100, on a peripheral device paired with the headset 100, or some combination thereof. Similarly, there may be more or fewer components on the headset 100 than what is shown in FIG. 1A.

The frame 110 holds the other components of the headset 100. The frame 110 includes a front part that holds the one or more display elements 120 and end pieces (e.g., temples) to attach to a head of the user. The front part of the frame 110 bridges the top of a nose of the user. The length of the end pieces may be adjustable (e.g., adjustable temple length) to fit different users. The end pieces may also include a portion that curls behind the ear of the user (e.g., temple tip, ear piece).

The one or more display elements 120 provide light to a user wearing the headset 100. As illustrated the headset includes a display element 120 for each eye of a user. In some embodiments, a display element 120 generates image light that is provided to an eyebox of the headset 100. The eyebox is a location in space that an eye of user occupies while wearing the headset 100. For example, a display element 120 may be a waveguide display. A waveguide display includes a light source (e.g., a two-dimensional source, one or more line sources, one or more point sources, etc.) and one or more waveguides. Light from the light source is in-coupled into the one or more waveguides which outputs the light in a manner such that there is pupil replication in an eyebox of the headset 100. In-coupling and/or outcoupling of light from the one or more waveguides may be done using one or more diffraction gratings. In some embodiments, the waveguide display includes a scanning element (e.g., waveguide, mirror, etc.) that scans light from the light source as it is in-coupled into the one or more waveguides. Note that in some embodiments, one or both of the display elements 120 are opaque and do not transmit light from a local area around the headset 100. The local area is the area surrounding the headset 100. For example, the local area may be a room that a user wearing the headset 100 is inside, or the user wearing the headset 100 may be outside and the local area is an outside area. In this context, the headset 100 generates VR content. Alternatively, in some embodiments, one or both of the display elements 120 are at least partially transparent, such that light from the local area may be combined with light from the one or more display elements to produce AR and/or MR content.

In some embodiments, a display element 120 does not generate image light, and instead is a lens that transmits light from the local area to the eyebox. For example, one or both of the display elements 120 may be a lens without correction (non-prescription) or a prescription lens (e.g., single vision, bifocal and trifocal, or progressive) to help correct for defects in a user's eyesight. In some embodiments, the display element 120 may be polarized and/or tinted to protect the user's eyes from the sun.

In some embodiments, the display element 120 may include an additional optics block (not shown). The optics block may include one or more optical elements (e.g., lens, Fresnel lens, etc.) that direct light from the display element 120 to the eyebox. The optics block may, e.g., correct for aberrations in some or all of the image content, magnify some or all of the image, or some combination thereof.

The DCA determines depth information for a portion of a local area surrounding the headset 100. The DCA includes one or more imaging devices 130 and a DCA controller (not shown in FIG. 1A), and may also include an illuminator 140.

In some embodiments, the illuminator 140 illuminates a portion of the local area with light. The light may be, e.g., structured light (e.g., dot pattern, bars, etc.) in the infrared (IR), IR flash for time-of-flight, etc. In some embodiments, the one or more imaging devices 130 capture images of the portion of the local area that include the light from the illuminator 140. As illustrated, FIG. 1A shows a single illuminator 140 and two imaging devices 130. In alternate embodiments, there is no illuminator 140 and at least two imaging devices 130.

The DCA controller computes depth information for the portion of the local area using the captured images and one or more depth determination techniques. The depth determination technique may be, e.g., direct time-of-flight (ToF) depth sensing, indirect ToF depth sensing, structured light, passive stereo analysis, active stereo analysis (uses texture added to the scene by light from the illuminator 140), some other technique to determine depth of a scene, or some combination thereof.

The audio system provides audio content. The audio system may further capture audio from the environment, e.g., a user's voice, ambient noise, other noise present in the environment, etc. The audio system includes a transducer array, a sensor array, and an audio controller 150. However, in other embodiments, the audio system may include different and/or additional components. Similarly, in some cases, functionality described with reference to the components of the audio system can be distributed among the components in a different manner than is described here. For example, some or all of the functions of the controller may be performed by a remote server.

The transducer array presents sound to user. The transducer array includes a plurality of transducers. A transducer may be a loudspeaker system 160 or a tissue transducer 170 (e.g., a bone conduction transducer or a cartilage conduction transducer). Although the loudspeaker systems 160 are shown exterior to the frame 110, the loudspeaker systems 160 may be enclosed in the frame 110. In some embodiments, instead of individual loudspeakers for each ear, the headset 100 includes a loudspeaker array comprising multiple loudspeaker systems integrated into the frame 110 to improve directionality of presented audio content. The tissue transducer 170 couples to the head of the user and directly vibrates tissue (e.g., bone or cartilage) of the user to generate sound. The number and/or locations of transducers may be different from what is shown in FIG. 1A.

The sensor array detects sounds within the local area of the headset 100. The sensor array includes a plurality of acoustic sensors 180. An acoustic sensor 180 captures sounds emitted from one or more sound sources in the local area (e.g., a room). Each acoustic sensor is configured to detect sound and convert the detected sound into an electronic format (analog or digital). The acoustic sensors 180 may be acoustic wave sensors, microphones, sound transducers, or similar sensors that are suitable for detecting sounds.

In some embodiments, one or more acoustic sensors 180 may be placed in an ear canal of each ear (e.g., acting as binaural microphones). In some embodiments, the acoustic sensors 180 may be placed on an exterior surface of the headset 100, placed on an interior surface of the headset 100, separate from the headset 100 (e.g., part of some other device), or some combination thereof. The number and/or locations of acoustic sensors 180 may be different from what is shown in FIG. 1A.

The position sensor 190 generates one or more measurement signals in response to motion of the headset 100. The position sensor 190 may be located on a portion of the frame 110 of the headset 100. The position sensor 190 may include an inertial measurement unit (IMU). Examples of position sensor 190 include: one or more accelerometers, one or more gyroscopes, one or more magnetometers, another suitable type of sensor that detects motion, a type of sensor used for error correction of the IMU, or some combination thereof. The position sensor 190 may be located external to the IMU, internal to the IMU, or some combination thereof.

In some embodiments, the headset 100 may provide for simultaneous localization and mapping (SLAM) for a position of the headset 100 and updating of a model of the local area. For example, the headset 100 may include a passive camera assembly (PCA) that generates color image data. The PCA may include one or more RGB cameras that capture images of some or all of the local area. In some embodiments, some or all of the imaging devices 130 of the DCA may also function as the PCA. The images captured by the PCA and the depth information determined by the DCA may be used to determine parameters of the local area, generate a model of the local area, update a model of the local area, or some combination thereof. Furthermore, the position sensor 190 tracks the position (e.g., location and pose) of the headset 100 within the room. Additional details regarding the components of the headset 100 are discussed below in connection with FIG. 7.

Figure 1B:
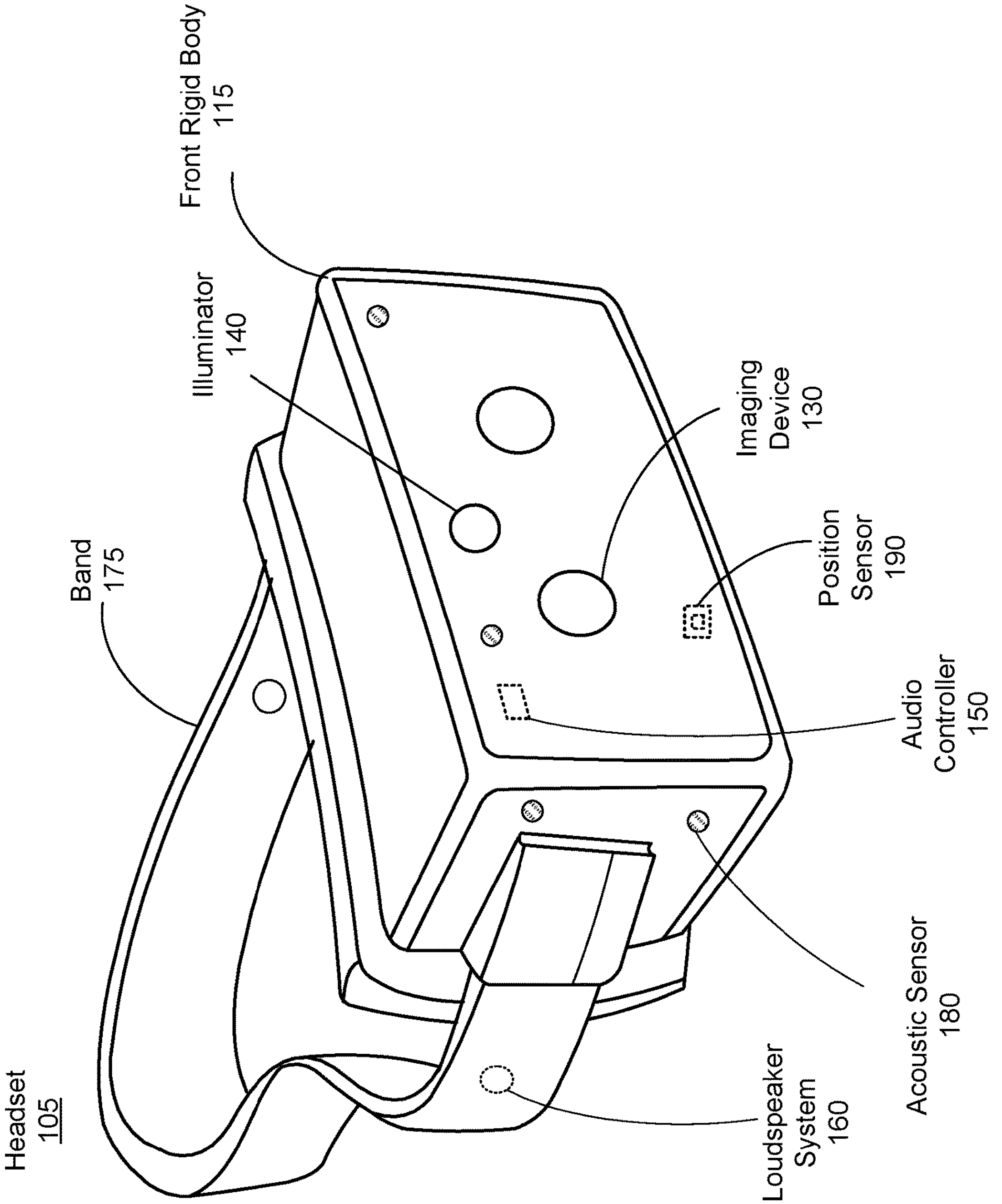
FIG. 1B is a perspective view of a headset 105 implemented as an HMD, in accordance with one or more embodiments.

FIG. 1B is a perspective view of a headset 105 implemented as an HMD, in accordance with one or more embodiments. In embodiments that describe an AR system and/or a MR system, portions of a front side of the HMD are at least partially transparent in the visible band (~380 nm to 750 nm), and portions of the HMD that are between the front side of the HMD and an eye of the user are at least partially transparent (e.g., a partially transparent electronic display). The HMD includes a front rigid body 115 and a band 175. The headset 105 includes many of the same components described above with reference to FIG. 1A, but modified to integrate with the HMD form factor. For example, the HMD includes a display assembly, a DCA, an audio system, and a position sensor 190. FIG. 1B shows the illuminator 140, a plurality of the loudspeaker systems 160, a plurality of the imaging devices 130, a plurality of acoustic sensors 180, and the position sensor 190. The loudspeaker systems 160 may be located in various locations, such as coupled to the band 175 (as shown), coupled to front rigid body 115, or may be configured to be inserted within the ear canal of a user.

The speaker array presents sound to user. The speaker array includes a plurality of speakers. In some embodiments, the speaker array may include one or more speakers to cover different parts of a frequency range. For example, a first speaker may be used to cover a first part of a frequency range and a second speaker may be used to cover a second part of a frequency range. The number and/or locations of speakers may vary. The speakers may be integrated into a frame of the headset, integrated into an in-ear device to provide audio content to an ear drum of the user, or some combination thereof.

The speaker presents audio content that may be received as input by one or more microphones of a microphone array of the device. The processing of the audio content presented by the speakers by the microphones may form a positive feedback loop that can result in instability in the system, thereby causing the howling.

The controller processes audio content captured by the sensor array. The controller may comprise a processor and a computer-readable storage medium. The controller may be configured to generate direction of arrival (DOA) estimates, generate acoustic transfer functions (e.g., array transfer functions and/or head-related transfer functions), track the location of sound sources, form beams in the direction of sound sources and/or the user, classify sound sources, generate sound filters for the transducer array, or some combination thereof.

Audio System Architecture

Figure 2:
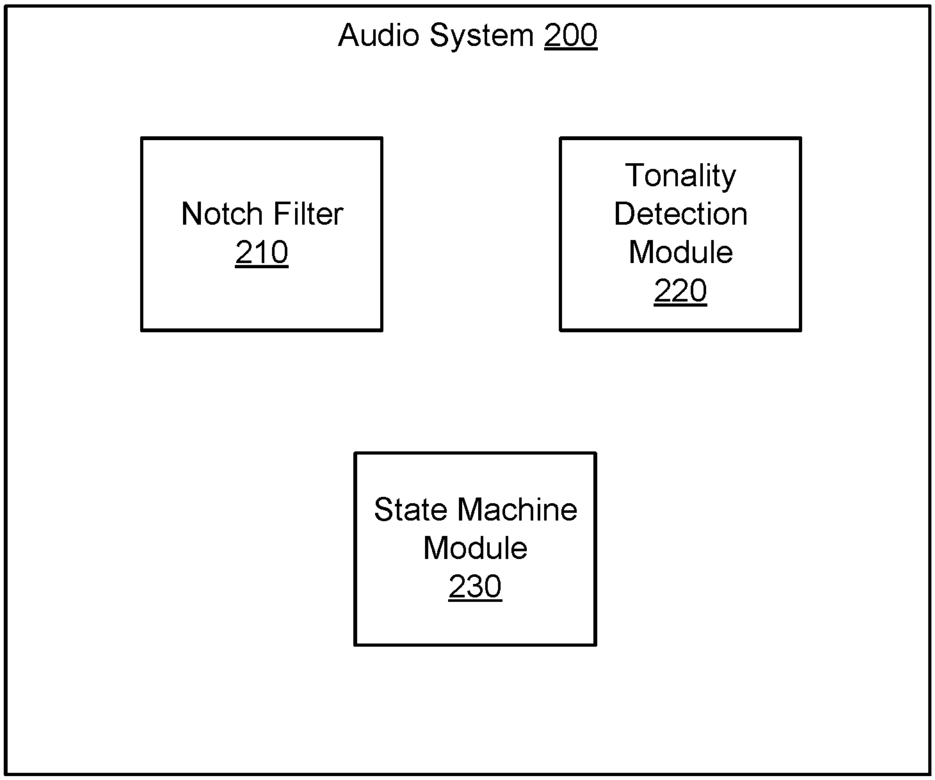
FIG. 2 is a block diagram of an audio system 200, in accordance with one or more embodiments.

FIG. 2 is a block diagram of an audio system 200, in accordance with one or more embodiments. The audio system 200 may include mechanical and electrical components used to produce sound as part of audio content provided to a user. The audio system 200 comprises a notch filter 210, a tonality detection module 220, a state machine module 230, and a content database 240 In other embodiments, the audio system 200 may comprise additional components, fewer components, different components, or some combination thereof. For example, the audio system 200 may comprise components such as one or more acoustic sensors, loudspeakers (not shown), or some combination thereof. In other embodiments, the various functions described as performable by the components may be variably distributed between the components.

The notch filter 210 is a signal filter that is designed to remove one or more frequencies from a signal. The notch filter may also be referred to as a band stop filter or band reject filter. A notch refers to a set of frequencies, for example, a frequency range that may be blocked by a notch filter 210. The notch filter 210 rejects (i.e., blocks) or attenuates signals in a specific frequency range called the stop band frequency range and passes the signals above and below this frequency range. According to an embodiment, the notch filter is an adaptive notch filter that is a variable notch filter such that the notch frequency of the notch filter is adaptively controlled in real time. According to an embodiment, the notch filter is a second order adaptive notch filter that has two poles and two zeros. The notch filter is adaptive since the system dynamically determines the frequencies where the howl occurs so that those frequencies can be suppressed.

The tonality detection module 220 monitors tonality of the audio signal processed to identify tones appearing in the signal. According to an embodiment, the tonality detection module 220 performs tonality detection using linear prediction.

The state machine module 230 manages a state machine that suppresses the howl detected in a device. The details of the state machine are shown in FIG. 4 and described in connection with FIG. 4.

Figure 3:
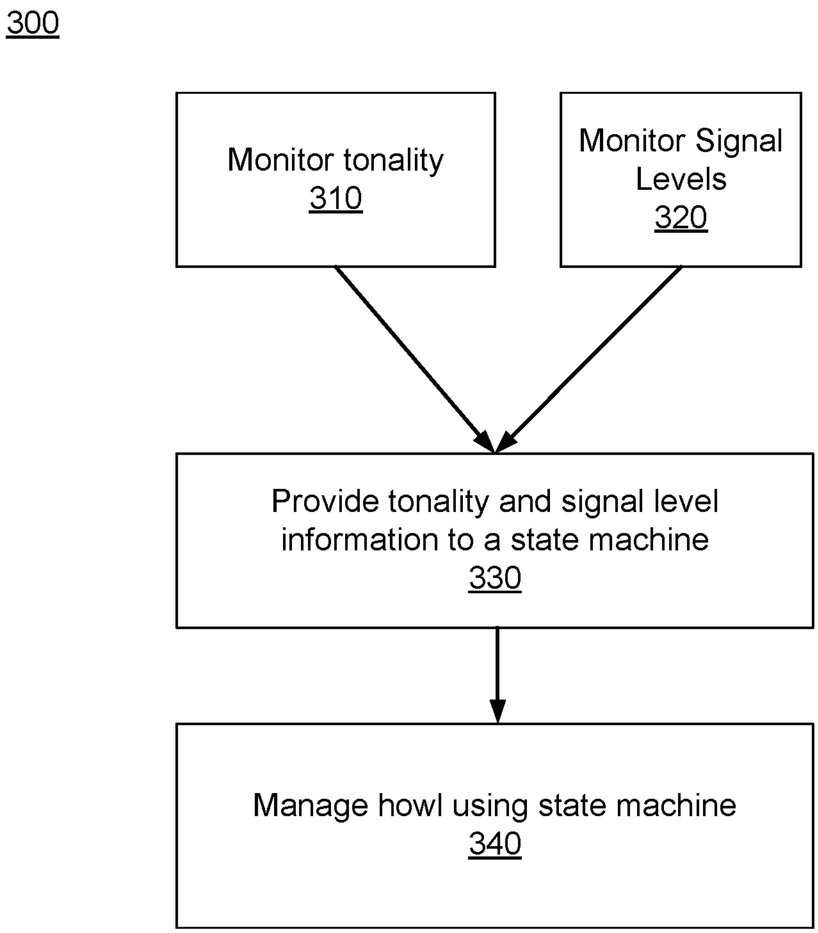
FIG. 3 shows the overall process flow illustrating how the system manages howl according to an embodiment.

FIG. 3 shows the overall process flow illustrating how the system manages howl according to an embodiment. The system monitors 310 tonality of the signal processed to identify tones appearing in the signal. A tone refers to a sound composed of a single frequency component. Tonality is a metric representing the relative weight of various tonal components in a signal. The signal may include tones that are not howls. The howl may occur due to instability and may occur at multiple frequencies where instability occurs. At theses frequencies, the level of the signal becomes very high, i.e., above a threshold value and is considered a howl. Accordingly, the system monitors 320 the signal levels to determine whether the signal level for particular tones exceeds a threshold value indicating occurrence of howl. The system combines the information monitored in the tonality and signal levels and provides 330 the combined information to a state machine. The system uses the state machine to manage 340 the howl.

Figure 4:
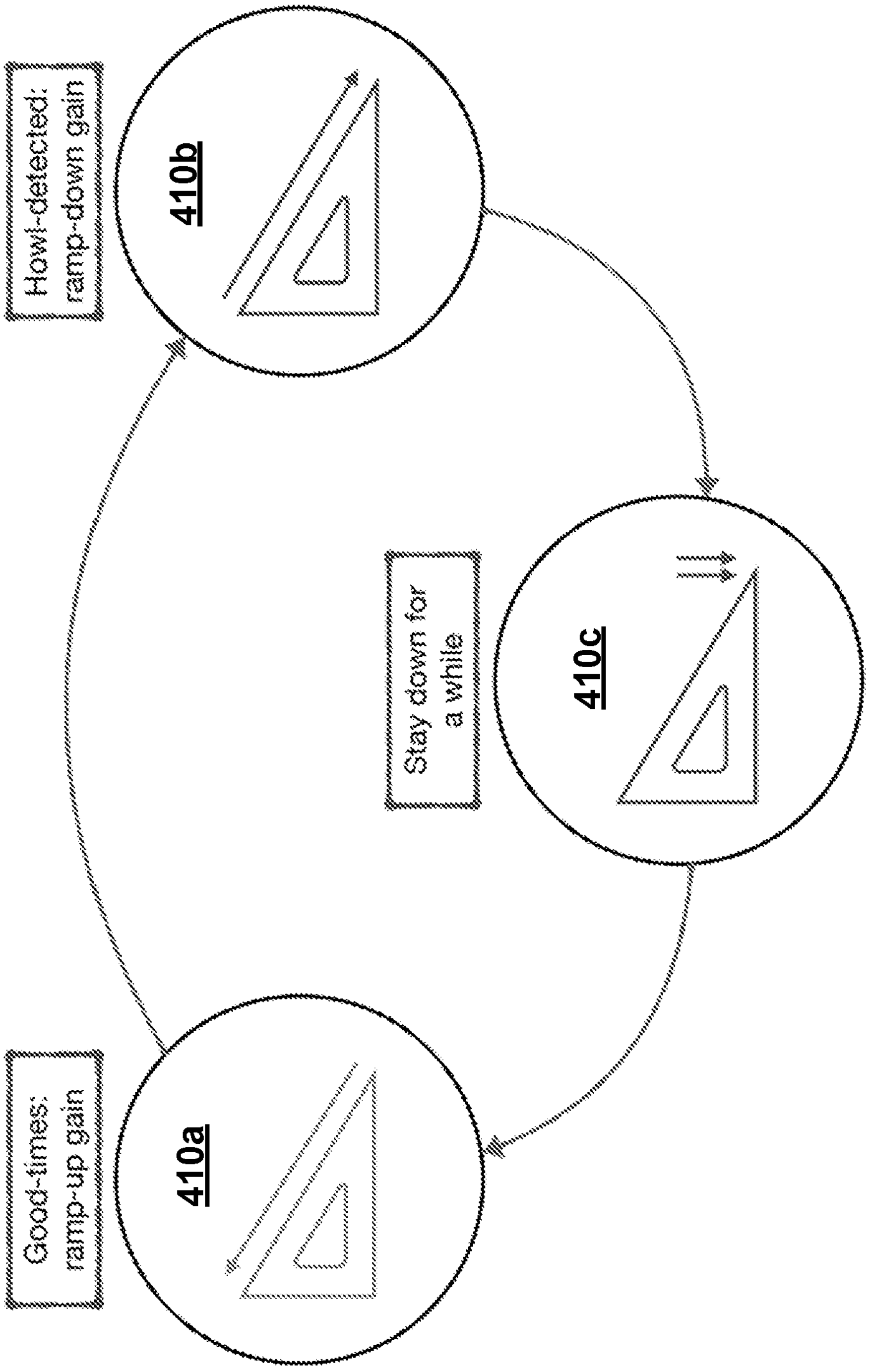
FIG. 4 illustrates the state machine used by the system to manage howl according to an embodiment.

FIG. 4 illustrates the state machine used by the system to manage howl according to an embodiment. The state 410*a* represents a state where there is no howl and the device is working properly without howl. The system increases (i.e., ramps up) the signal to provide better sound and better user experience to the user via the device. The system may continue increasing the gain to reach a maximum gain value. The system may detect howl and reach the state 410*b*. In response to detecting howl, the system decreases (i.e., ramps down) the gain in state 410*b*. The system attempts to stabilize the system by reducing the gain in an attempt to eliminate the howl. The system keeps the reduced gain for at least a threshold time in state 410*c* and waits for the howl to get eliminated. Once the howl disappears, the system may return to state 410*a* and again start increasing the gain.

Figure 5:
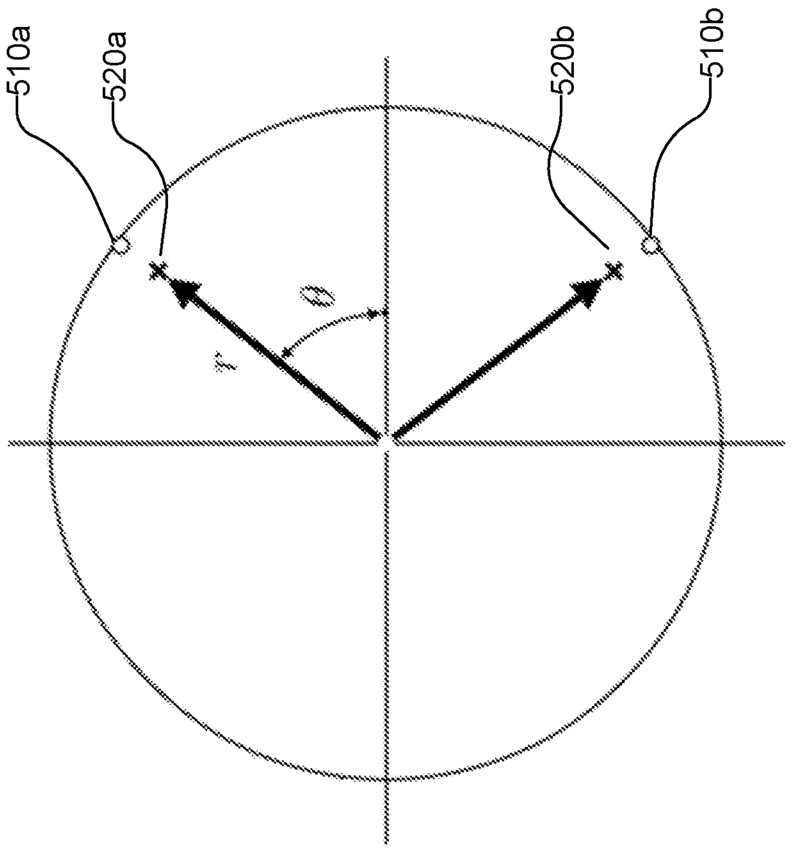
FIG. 5 illustrates a second order adaptive notch filter with two poles and two zeros, according to an embodiment.

FIG. 5 illustrates a second order adaptive notch filter with two poles and two zeros, according to an embodiment. As shown in FIG. 5, the poles 510*a*, 510*b* are represented using circles and the zeros 520*a*, 52*b* are represented using Xs. The poles are on the unit circle but the zeros are closer to the origin than the poles. The radius r shown in FIG. 5 is the distance of the zeros from the origin. The radius r is less than the radius of unit circles to avoid the zeros being too close to the poles which avoids instability. The angle θ determines where the notch is placed in the frequency domain to block or attenuate a cluster of frequencies that represent a howl.

The following equation (1) represents a two-pole notch filter according to an embodiment.

$$H(z) = \frac{(1 - e^{j\theta}z^{-1})(1 - e^{-j\theta}z^{-1})}{(1 - re^{j\theta}z^{-1})(1 - re^{-j\theta}z^{-1})} \quad (1)$$

In the equation (1) the two terms in the numerator represent the zeros of the notch filter and the two terms in the denominator represent the poles of the notch filter. The equation (1) can be simplified into equation (2). In equation 2, the term cos(0) represents the location of the notch in frequency domain and r represents the depth of the notch.

$$H(z) = \frac{1 - 2\cos(\theta)z^{-1} + z^{-2}}{1 - 2r\cos(\theta)z^{-1} + r^2 z^{-2}} \quad (2)$$

The system determines the location of the notch, i.e., the set or range of frequencies that where the howl is present and that need to be blocked. According to an embodiment, the system uses linear prediction to determine the location of the notch filter. The system uses linear prediction by determining the location of the notch filter using a linear function of samples. According to an embodiment, the system determines whether a howl is present based on variance of the predictive estimates of the linear predictor.

Figure 6:
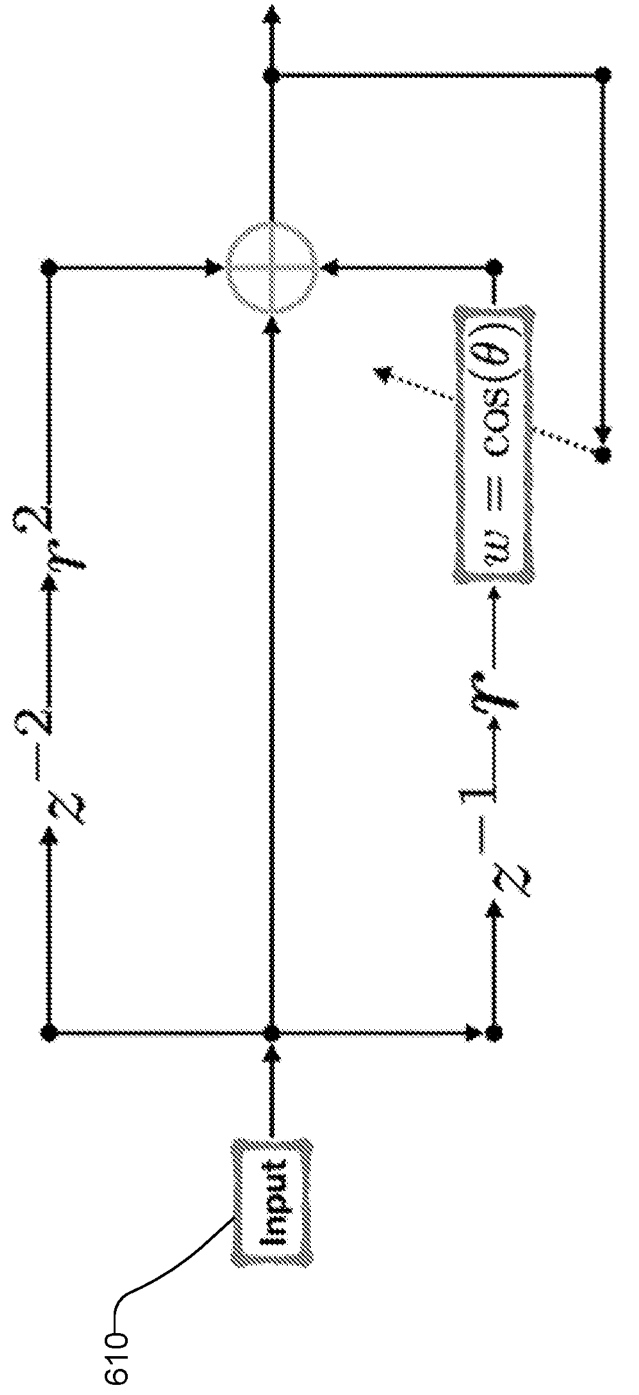
FIG. 6 illustrates an adaptive graph based on terms of the notch filter, according to an embodiment.

FIG. 6 illustrates an adaptive graph based on terms of the notch filter, according to an embodiment. For example, FIG. 6 represents the denominator of the equation (2), i.e., the expression $1\text{-}2r\cos(\theta)z^{-1}+r^2z^{-2}$. The adaptive graph receives an input signal 610. The term $z^{-2}$ represents a second order delay. The input delayed by second order delay is multiplied by the term $r^2$ representing a tuning parameter. The term $z^{-1}$ represents a first order delay. The input delayed by first order delay is multiplied by the term r representing a tuning parameter and further multiplied by the term cos(θ) representing the location of the notch. The system runs the adaptive graph shown in FIG. 6. When the system converges, the term w=cos(θ) is determined, thereby providing the frequency of the howl. To extract the frequency of the howl, from the value of the cos(θ) the system may use the equation (3). Accordingly, the system determines the inverse cosine of the value w, divides the result by π and multiplies it by the term $f_s/2$, where $f_s$ represents the sampling frequency. The result is the frequency $f_{hz}$ that represents the location of the howl.

$$f_{hz} = \frac{\cos^{-1}(w)}{\pi} \cdot \frac{f_s}{2} \tag{3}$$

Figure 7:
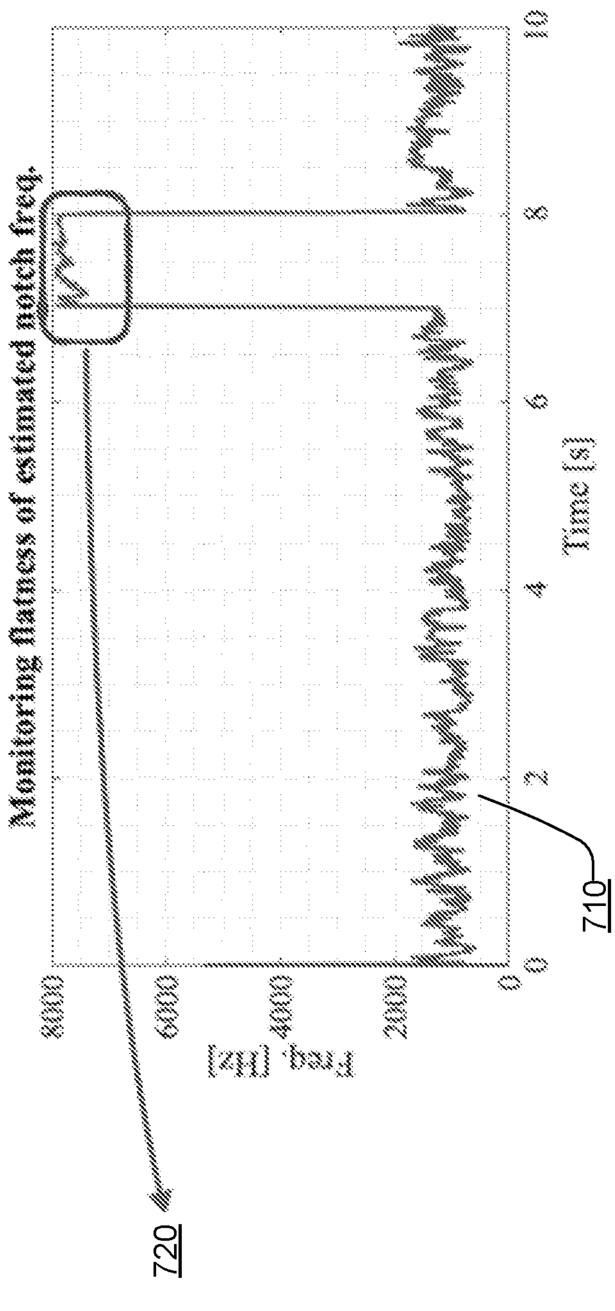
FIG. 7 illustrates monitoring of flatness of the signal to determine the howl frequencies according to an embodiment.
Figure 8:
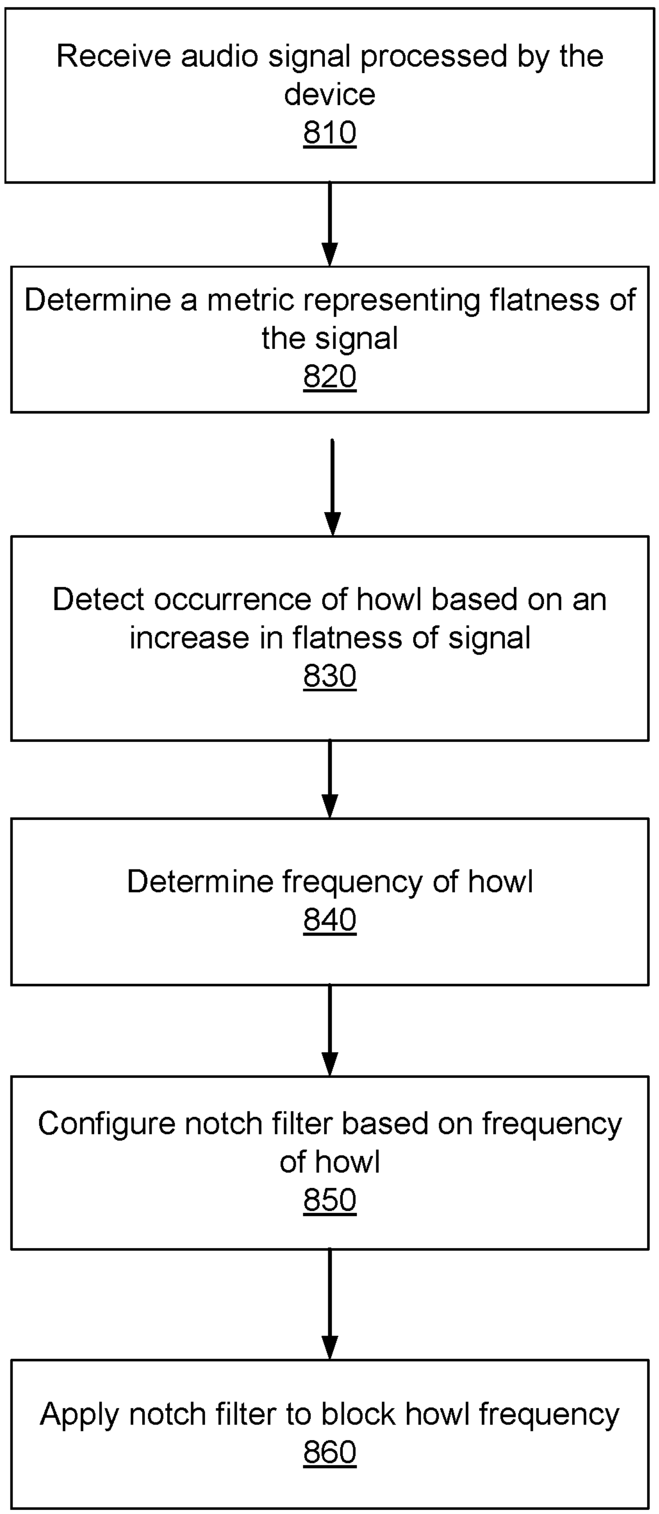
FIG. 8 illustrates a process for determining howl frequency by measuring flatness of the signal, according to an embodiment.

FIG. 8 illustrates a process for determining howl frequency by measuring flatness of the signal, according to an embodiment. The system receives 810 audio signal that is processed by the device that includes both speaker(s) and microphone(s). The system determines 820 a metric representing flatness of the signal. FIG. 7 illustrates monitoring of flatness of the signal to determine the howl frequencies according to an embodiment. As shown in FIG. 7, the signal is flat, i.e., the signal 720 is within a short range of frequencies when the howl is present as compared to the signal 710 when no howl is present. Accordingly, the signal when howl is present is more stable compared to the signal without the howl. The signal 710 when no howl is present has a wider range of frequencies compared to the signal 720. During certain time interval the system may detect 830 howl based on the flatness metric, for example, if the system determines that the flatness of the signal suddenly increases by more than a threshold value. The system may run the state machine illustrated in FIG. 4 to determine 840 the howl frequency accurately. For example, the system may increase the gain of the signal at particular frequencies to determine whether howl is generated. If the howl is generated by a particular frequency, the system selects that frequency as the howl frequency. Once the system determines the howl frequency, the system configures 850 the notch filter based on the frequency of howl. The system applies 860 the notch filter to the signal to remove the howl.

The howl frequency determined by the system using the adaptive notch filter prediction may not represent the actual frequency at which the howl occurs. For example, the howl may occur at two frequencies f1 and f2 and the adaptive notch filter may predict that the howl is at a frequency f3 that is an average of the two frequencies f1 and f2 and is different from both f1 and f2. The system monitors whether the adaptive notch filter is consistently predicting the same frequency f3. The system uses this prediction as indicating that howl is occurring in the system which many be at a frequency different from the frequency f3 predicted using the adaptive notch filter prediction. If the howl occurs at one frequency, the adaptive notch filter accurately predicts the howl frequency. In this embodiment, the system uses the adaptive notch filter to not eliminate the howl but just to detect the presence of howl. The system eliminates the howl by reducing the gain for all frequencies of the signal as indicated in state 410*b* of FIG. 4. By reducing the gain, the system eliminates the howl.

According to an embodiment, the system divides the frequencies into a plurality of frequency ranges and an adaptive notch filter is assigned to each frequency range. Accordingly, if the notch filter assigned to a particular frequency range indicates detection of howl, the system determines that the howl frequency is within that frequency range. Accordingly, the system reduces gain of the signal in all the frequencies within that frequency range to eliminate the howl. In this embodiment, the gain of the signal in remaining frequency ranges is not reduced and the user can still hear the signal.

According to an embodiment, the system monitors gain using a first order smoothing based level detector that detects the level of then signal and performs smoothing of the level. A system may use a coherence function to perform tonality detection in sub-band domain that can also detect the howl for suppressing the howl. The system determines a coherence between the signal and a delayed signal. The coherence is an indication of tonal components of the signal including howl. A coherence function-based detection of tonality may be very noisy thereby creating difficulty in placement of thresholds.

The system according to an embodiment uses linear prediction instead of coherence function. The linear prediction may be expressed using the following equations.

$$E(k,\tau) = Y(k,\tau) - C_y(k,\tau-1)\cdot Y(k,\tau-1) \tag{4}$$

$$\Psi(k,\tau) = \Psi(k,\tau)\cdot(1-\alpha) + \alpha\cdot|Y(k,\tau-1)|^2 \tag{5}$$

$$\mu(k,\tau) = \frac{\mu_0}{\Psi_{k,\tau}+\delta} \tag{6}$$

$$C_y(k,\tau) = A_{leak}\cdot C_y(k,\tau-1) + \mu(k,\tau)\cdot E(k,\tau)\cdot Y^*(k,\tau-1) \tag{7}$$

The variables used in the equation are as follows.

τ→block-time index k→subband-frequency index

E(k,τ)→Error signal

Y(k,τ)→input signal

Y(k,τ−1)→delayed input signal $C_y$(k,τ)→linear prediction weight

α→smoothing constant

Ψ(k,τ)→excitation energy

μ(k,τ)→step-size $A_{leak}$→leakage parameter

Accordingly, the system determines an error signal E(k,τ) based on equation (4). The system further determines an excitation energy Ψ(k,τ) using equation (5). The system determines the step size μ(k,τ) using equation (6). The system determines a linear prediction weight $C_y$(k,τ) using equation (7).

Figure 9:
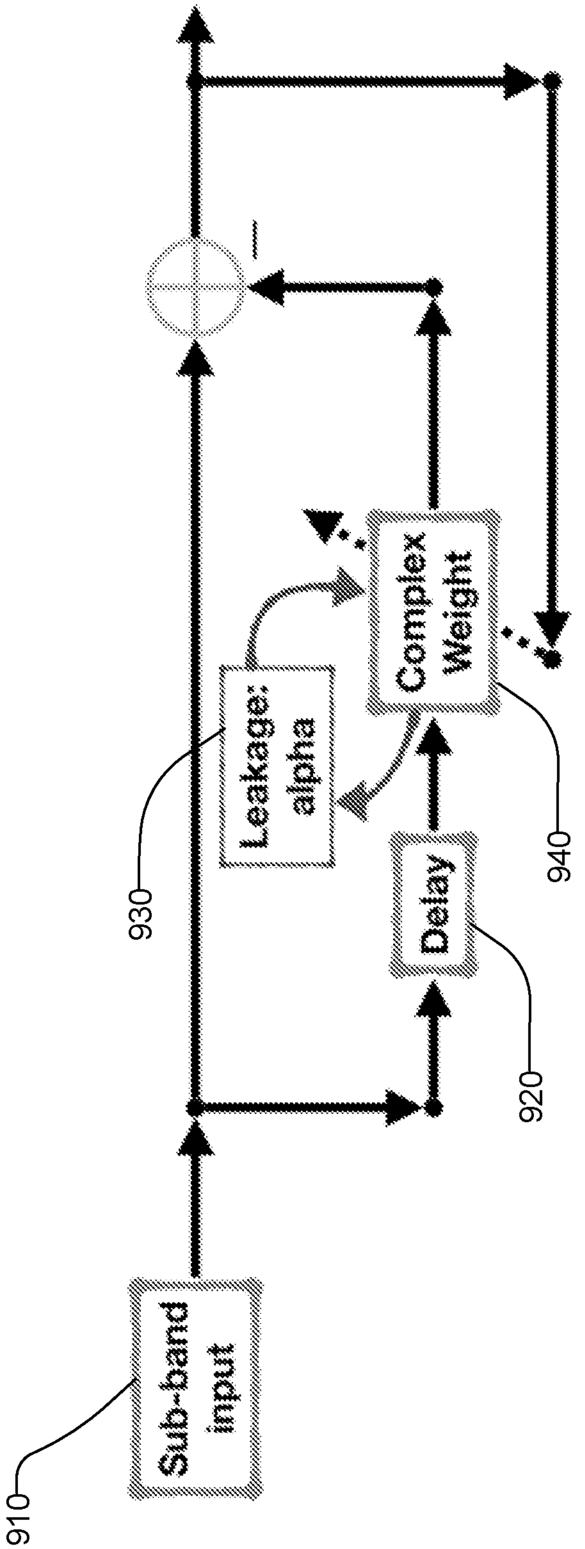
FIG. 9 shows a graph illustrating tonality detection in a sub-band using linear prediction in frequency domain according to an embodiment.

FIG. 9 shows a graph illustrating tonality detection in a sub-band using linear prediction in frequency domain according to an embodiment. The system receives a sub-band input 910 for a particular band of frequencies. The sub-band input is delayed 820. The system estimates a complex weight 940 that undergoes a leakage 930 by a term alpha. The complex weight $C_y$(k,τ) is determined using the equations (4), (5), (6), and (7). The system uses the complex weight as an indication of tonality including the howl. The tonality detection based on linear prediction is significantly less noisy compared to a coherence-based tonality detection, for example, when there are no howls or significant tones.

Example System Environment

Figure 10:
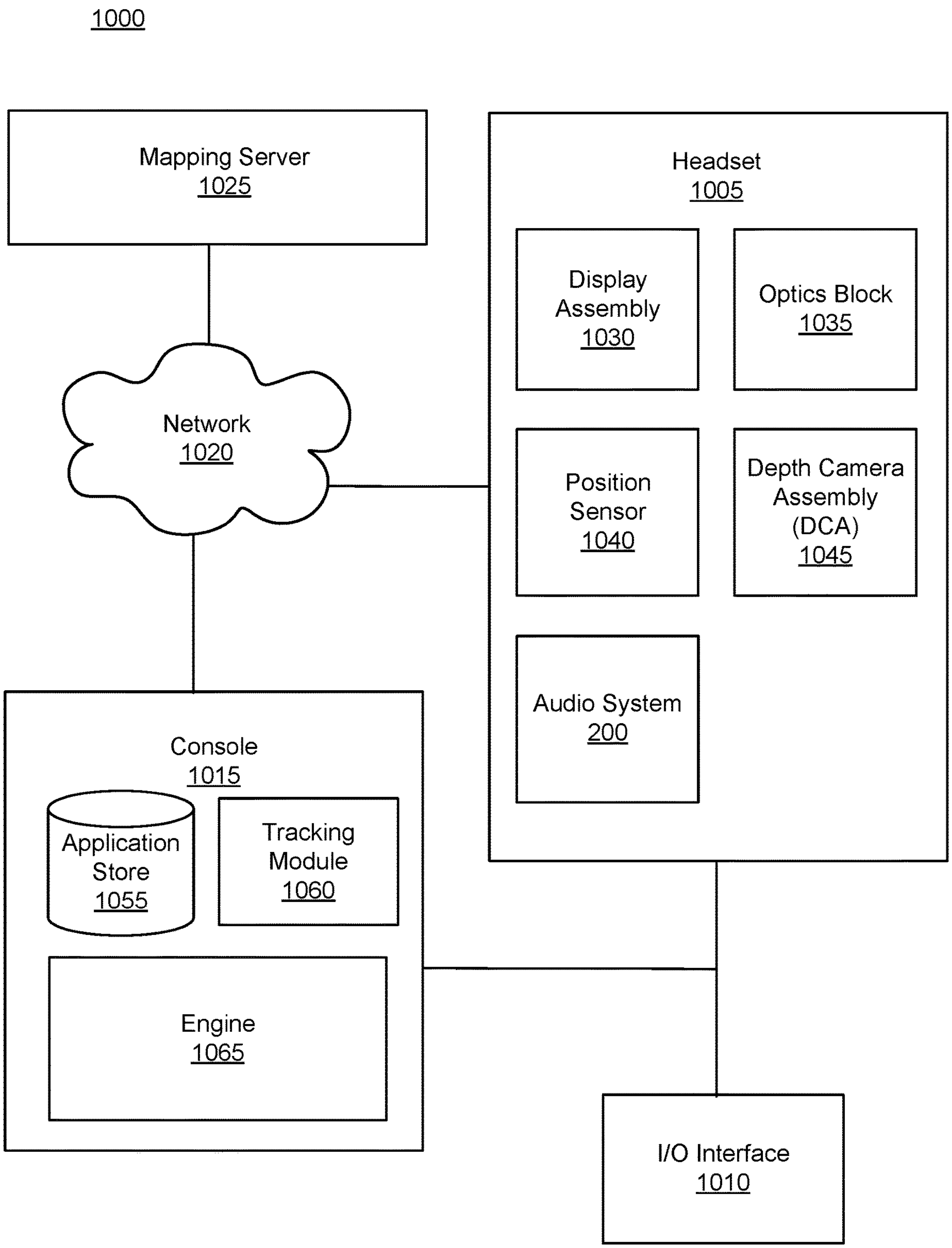
FIG. 10 is a system that includes a headset, in accordance with one or more embodiments.

FIG. 10 is a system 1000 that includes a headset 1005, in accordance with one or more embodiments. In some embodiments, the headset 1005 may be the headset 100 of FIG. 1A or the headset 105 of FIG. 1B. The system 1000 may operate in an artificial reality environment (e.g., a virtual reality environment, an augmented reality environment, a mixed reality environment, or some combination thereof). The system 1000 shown by FIG. 10 includes the headset 1005, an input/output (I/O) interface 1010 that is coupled to a console 1015, the network 1020, and the mapping server 1025. While FIG. 10 shows an example system 1000 including one headset 1005 and one I/O interface 1010, in other embodiments any number of these components may be included in the system 1000. For example, there may be multiple headsets each having an associated I/O interface 1010, with each headset and I/O interface 1010 communicating with the console 1015. In alternative configurations, different and/or additional components may be included in the system 1000. Additionally, functionality described in conjunction with one or more of the components shown in FIG. 10 may be distributed among the components in a different manner than described in conjunction with FIG. 10 in some embodiments. For example, some or all of the functionality of the console 1015 may be provided by the headset 1005.

The headset 1005 includes the display assembly 1030, an optics block 1035, one or more position sensors 1040, the DCA 1045, and the audio system 200. Some embodiments of headset 1005 have different components than those described in conjunction with FIG. 10. Additionally, the functionality provided by various components described in conjunction with FIG. 10 may be differently distributed among the components of the headset 1005 in other embodiments, or be captured in separate assemblies remote from the headset 1005.

The display assembly 1030 displays content to the user in accordance with data received from the console 1015. The display assembly 1030 displays the content using one or more display elements (e.g., the display elements 120). A display element may be, e.g., an electronic display. In various embodiments, the display assembly 1030 comprises a single display element or multiple display elements (e.g., a display for each eye of a user). Examples of an electronic display include: a liquid crystal display (LCD), an organic light emitting diode (OLED) display, an active-matrix organic light-emitting diode display (AMOLED), a waveguide display, some other display, or some combination thereof. Note in some embodiments, the display element 120 may also include some or all of the functionality of the optics block 1035.

The optics block 1035 may magnify image light received from the electronic display, corrects optical errors associated with the image light, and presents the corrected image light to one or both eyeboxes of the headset 1005. In various embodiments, the optics block 1035 includes one or more optical elements. Example optical elements included in the optics block 1035 include: an aperture, a Fresnel lens, a convex lens, a concave lens, a filter, a reflecting surface, or any other suitable optical element that affects image light. Moreover, the optics block 1035 may include combinations of different optical elements. In some embodiments, one or more of the optical elements in the optics block 1035 may have one or more coatings, such as partially reflective or anti-reflective coatings.

Magnification and focusing of the image light by the optics block 1035 allows the electronic display to be physically smaller, weigh less, and consume less power than larger displays. Additionally, magnification may increase the field of view of the content presented by the electronic display. For example, the field of view of the displayed content is such that the displayed content is presented using almost all (e.g., approximately 110 degrees diagonal), and in some cases, all of the user's field of view. Additionally, in some embodiments, the amount of magnification may be adjusted by adding or removing optical elements.

In some embodiments, the optics block 1035 may be designed to correct one or more types of optical error. Examples of optical error include barrel or pincushion distortion, longitudinal chromatic aberrations, or transverse chromatic aberrations. Other types of optical errors may further include spherical aberrations, chromatic aberrations, or errors due to the lens field curvature, astigmatisms, or any other type of optical error. In some embodiments, content provided to the electronic display for display is pre-distorted, and the optics block 1035 corrects the distortion when it receives image light from the electronic display generated based on the content.

The position sensor 1040 is an electronic device that generates data indicating a position of the headset 1005. The position sensor 1040 generates one or more measurement signals in response to motion of the headset 1005. The position sensor 190 is an embodiment of the position sensor 1040. Examples of a position sensor 1040 include: one or more IMUs, one or more accelerometers, one or more gyroscopes, one or more magnetometers, another suitable type of sensor that detects motion, or some combination thereof. The position sensor 1040 may include multiple accelerometers to measure translational motion (forward/back, up/down, left/right) and multiple gyroscopes to measure rotational motion (e.g., pitch, yaw, roll). In some embodiments, an IMU rapidly samples the measurement signals and calculates the estimated position of the headset 1005 from the sampled data. For example, the IMU integrates the measurement signals received from the accelerometers over time to estimate a velocity vector and integrates the velocity vector over time to determine an estimated position of a reference point on the headset 1005. The reference point is a point that may be used to describe the position of the headset 1005. While the reference point may generally be defined as a point in space, however, in practice the reference point is defined as a point within the headset 1005.

The DCA 1045 generates depth information for a portion of the local area. The DCA includes one or more imaging devices and a DCA controller. The DCA 1045 may also include an illuminator. Operation and structure of the DCA 1045 is described above with regard to FIG. 1A.

The I/O interface 1010 is a device that allows a user to send action requests and receive responses from the console 1015. An action request is a request to perform a particular action. For example, an action request may be an instruction to start or end capture of image or video data, or an instruction to perform a particular action within an application. The I/O interface 1010 may include one or more input devices. Example input devices include: a keyboard, a mouse, a game controller, or any other suitable device for receiving action requests and communicating the action requests to the console 1015. An action request received by the I/O interface 1010 is communicated to the console 1015, which performs an action corresponding to the action request. In some embodiments, the I/O interface 1010 includes an IMU that captures calibration data indicating an estimated position of the I/O interface 1010 relative to an initial position of the I/O interface 1010. In some embodiments, the I/O interface 1010 may provide haptic feedback to the user in accordance with instructions received from the console 1015. For example, haptic feedback is provided when an action request is received, or the console 1015 communicates instructions to the I/O interface 1010 causing the I/O interface 1010 to generate haptic feedback when the console 1015 performs an action.

The console 1015 provides content to the headset 1005 for processing in accordance with information received from one or more of: the DCA 1045, the headset 1005, and the I/O interface 1010. In the example shown in FIG. 10, the console 1015 includes an application store 1055, a tracking module 1060, and an engine 1065. Some embodiments of the console 1015 have different modules or components than those described in conjunction with FIG. 10. Similarly, the functions further described below may be distributed among components of the console 1015 in a different manner than described in conjunction with FIG. 10. In some embodiments, the functionality discussed herein with respect to the console 1015 may be implemented in the headset 1005, or a remote system.

The application store 1055 stores one or more applications for execution by the console 1015. An application is a group of instructions, that when executed by a processor, generates content for presentation to the user. Content generated by an application may be in response to inputs received from the user via movement of the headset 1005 or the I/O interface 1010. Examples of applications include: gaming applications, conferencing applications, video playback applications, or other suitable applications.

The tracking module 1060 tracks movements of the headset 1005 or of the I/O interface 1010 using information from the DCA 1045, the one or more position sensors 1040, or some combination thereof. For example, the tracking module 1060 determines a position of a reference point of the headset 1005 in a mapping of a local area based on information from the headset 1005. The tracking module 1060 may also determine positions of an object or virtual object. Additionally, in some embodiments, the tracking module 1060 may use portions of data indicating a position of the headset 1005 from the position sensor 1040 as well as representations of the local area from the DCA 1045 to predict a future location of the headset 1005. The tracking module 1060 provides the estimated or predicted future position of the headset 1005 or the I/O interface 1010 to the engine 1065.

The engine 1065 executes applications and receives position information, acceleration information, velocity information, predicted future positions, or some combination thereof, of the headset 1005 from the tracking module 1060. Based on the received information, the engine 1065 determines content to provide to the headset 1005 for presentation to the user. For example, if the received information indicates that the user has looked to the left, the engine 1065 generates content for the headset 1005 that mirrors the user's movement in a virtual local area or in a local area augmenting the local area with additional content. Additionally, the engine 1065 performs an action within an application executing on the console 1015 in response to an action request received from the I/O interface 1010 and provides feedback to the user that the action was performed. The provided feedback may be visual or audible feedback via the headset 1005 or haptic feedback via the I/O interface 1010.

The network 1020 couples the headset 1005 and/or the console 1015 to the mapping server 1025. The network 1020 may include any combination of local area and/or wide area networks using both wireless and/or wired communication systems. For example, the network 1020 may include the Internet, as well as mobile telephone networks. In one embodiment, the network 1020 uses standard communications technologies and/or protocols. Hence, the network 1020 may include links using technologies such as Ethernet, 802.11, worldwide interoperability for microwave access (WiMAX), 2G/3G/4G mobile communications protocols, digital subscriber line (DSL), asynchronous transfer mode (ATM), InfiniBand, PCI Express Advanced Switching, etc. Similarly, the networking protocols used on the network 1020 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 1020 can be represented using technologies and/or formats including image data in binary form (e.g. Portable Network Graphics (PNG)), hypertext markup language (HTML), extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc.

The mapping server 1025 may include a database that stores a virtual model describing a plurality of spaces, wherein one location in the virtual model corresponds to a current configuration of a local area of the headset 1005. The mapping server 1025 receives, from the headset 1005 via the network 1020, information describing at least a portion of the local area and/or location information for the local area. The user may adjust privacy settings to allow or prevent the headset 1005 from transmitting information to the mapping server 1025. The mapping server 1025 determines, based on the received information and/or location information, a location in the virtual model that is associated with the local area of the headset 1005. The mapping server 1025 determines (e.g., retrieves) one or more acoustic parameters associated with the local area, based in part on the determined location in the virtual model and any acoustic parameters associated with the determined location. The mapping server 1025 may transmit the location of the local area and any values of acoustic parameters associated with the local area to the headset 1005.

One or more components of system 1000 may contain a privacy module that stores one or more privacy settings for user data elements. The user data elements describe the user or the headset 1005. For example, the user data elements may describe a physical characteristic of the user, an action performed by the user, a location of the user of the headset 1005, a location of the headset 1005, an HRTF for the user, etc. Privacy settings (or "access settings") for a user data element may be stored in any suitable manner, such as, for example, in association with the user data element, in an index on an authorization server, in another suitable manner, or any suitable combination thereof.

A privacy setting for a user data element specifies how the user data element (or particular information associated with the user data element) can be accessed, stored, or otherwise used (e.g., viewed, shared, modified, copied, executed, surfaced, or identified). In some embodiments, the privacy settings for a user data element may specify a "blocked list" of entities that may not access certain information associated with the user data element. The privacy settings associated with the user data element may specify any suitable granularity of permitted access or denial of access. For example, some entities may have permission to see that a specific user data element exists, some entities may have permission to view the content of the specific user data element, and some entities may have permission to modify the specific user data element. The privacy settings may allow the user to allow other entities to access or store user data elements for a finite period of time.

The privacy settings may allow a user to specify one or more geographic locations from which user data elements can be accessed. Access or denial of access to the user data elements may depend on the geographic location of an entity who is attempting to access the user data elements. For example, the user may allow access to a user data element and specify that the user data element is accessible to an entity only while the user is in a particular location. If the user leaves the particular location, the user data element may no longer be accessible to the entity. As another example, the user may specify that a user data element is accessible only to entities within a threshold distance from the user, such as another user of a headset within the same local area as the user. If the user subsequently changes location, the entity with access to the user data element may lose access, while a new group of entities may gain access as they come within the threshold distance of the user.

The system 1000 may include one or more authorization/privacy servers for enforcing privacy settings. A request from an entity for a particular user data element may identify the entity associated with the request and the user data element may be sent only to the entity if the authorization server determines that the entity is authorized to access the user data element based on the privacy settings associated with the user data element. If the requesting entity is not authorized to access the user data element, the authorization server may prevent the requested user data element from being retrieved or may prevent the requested user data element from being sent to the entity. Although this disclosure describes enforcing privacy settings in a particular manner, this disclosure contemplates enforcing privacy settings in any suitable manner.

Additional Configuration Information

The foregoing description of the embodiments has been presented for illustration; it is not intended to be exhaustive or to limit the patent rights to the precise forms disclosed. Persons skilled in the relevant art can appreciate that many modifications and variations are possible considering the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A computer-implemented method for suppressing howl in a device comprising one or more microphones and one or more speakers, the computer-implemented method comprising:

presenting audio content via a speaker of the device;

receiving by a microphone of the device, the audio content presented via the speaker;

detecting presence of a howl in a region of the audio content using linear prediction to determine a location of an adaptive notch filter; and suppressing the howl in the region of the audio content by reducing gain of one or more frequencies of the howl in the region of the audio content corresponding to the determined location of the adaptive notch filter.

2. The computer-implemented method of claim 1, wherein detecting presence of the howl comprises:

monitoring flatness of signal; and responsive to detecting more than a threshold flatness of signal, determining that howl is present.

3. The computer-implemented method of claim 1, wherein the adaptive notch filter is one of a plurality of adaptive notch filters, wherein the audio content comprises signals of a plurality of frequency ranges, each adaptive notch filter from the plurality of adaptive notch filters associated with a frequency range from the plurality of frequency ranges, wherein the adaptive notch filter is associated with a particular frequency range, wherein suppressing the howl comprises:

reducing gain of frequencies of the particular frequency range.

4. The computer-implemented method of claim 1, wherein suppressing the howl further comprises:

responsive to reducing the gain of the one or more frequencies of the audio content, keeping the gain low for at least a threshold amount of time, thereby eliminating the howl.

5. The computer-implemented method of claim 4, further comprising: responsive to eliminating the howl, increasing gain for the one or more frequencies.

6. The computer-implemented method of claim 1, wherein the adaptive notch filter has two poles and two zeros.

7. The computer-implemented method of claim 1, wherein detecting presence of the howl comprises tonality detection based on the linear prediction.

8. The computer-implemented method of claim 1, wherein the device is an artificial reality headset.

9. A non-transitory computer-readable storage medium storing instructions for suppressing howl in a device comprising one or more microphones and one or more speakers, the instructions when executed by a computer processor, cause the computer processor to perform steps comprising:

presenting audio content via a speaker of the device;

receiving by a microphone of the device, the audio content presented via the speaker;

detecting presence of a howl in a region of the audio content using linear prediction to determine a location of an adaptive notch filter; and suppressing the howl in the region of the audio content by reducing gain of one or more frequencies of the howl in the region of the audio content corresponding to the determined location of the adaptive notch filter.

10. The non-transitory computer-readable storage medium of claim 9, wherein instructions for detecting presence of the howl comprise instructions that cause the computer processor to perform steps comprising:

monitoring flatness of signal; and responsive to detecting more than a threshold flatness of signal, determining that howl is present.

11. The non-transitory computer-readable storage medium of claim 9, wherein the adaptive notch filter is one of a plurality of adaptive notch filters, wherein the audio content comprises signals of a plurality of frequency ranges, each adaptive notch filter from the plurality of adaptive notch filters associated with a frequency range from the plurality of frequency ranges, wherein the adaptive notch filter is associated with a particular frequency range, wherein instructions for suppressing the howl comprise instructions that cause the computer processor to perform steps comprising:

reducing gain of frequencies of the particular frequency range.

12. The non-transitory computer-readable storage medium of claim 9, wherein instructions for suppressing the howl comprise instructions that cause the computer processor to perform steps comprising:

responsive to reducing the gain of the one or more frequencies of the audio content, keeping the gain low for at least a threshold amount of time, thereby eliminating the howl.

13. The non-transitory computer-readable storage medium of claim 12, wherein the instructions further cause the computer processor to:

responsive to eliminating the howl, increasing gain for the one or more frequencies.

14. The non-transitory computer-readable storage medium of claim 9, wherein detecting presence of the howl comprises tonality detection based on the linear prediction.

15. A device comprising:

one or more speakers configured to present audio content via a speaker of the device;

one or more microphones configured to receive the audio content presented via the speaker; and a non-transitory computer-readable storage medium storing instructions for suppressing howl in a device comprising one or more microphones and one or more speakers, the instructions when executed by a computer processor, cause the computer processor to perform steps comprising:

detecting presence of a howl in a region of the audio content using linear prediction to determine a location of an adaptive notch filter; and suppressing the howl in the region of the audio content by reducing gain of one or more frequencies of the howl in the region of the audio content corresponding to the determined location of the adaptive notch filter.

16. The device of claim 15, wherein instructions for detecting presence of the howl comprise instructions that cause the device to perform steps comprising:

monitoring flatness of signal; and responsive to detecting more than a threshold flatness of signal, determining that howl is present.

17. The device of claim 15, wherein the adaptive notch filter is one of a plurality of adaptive notch filters, wherein the audio content comprises signals of a plurality of frequency ranges, each adaptive notch filter from the plurality of adaptive notch filters associated with a frequency range from the plurality of frequency ranges, wherein the adaptive notch filter is associated with a particular frequency range, wherein instructions for suppressing the howl comprise instructions that cause the computer processor to perform steps comprising:

reducing gain of frequencies of the particular frequency range.

18. The device of claim 15, wherein instructions for suppressing the howl comprise instructions that cause the computer processor to perform steps comprising:

responsive to reducing the gain of the one or more frequencies of the audio content, keeping the gain low for at least a threshold amount of time, thereby eliminating the howl.

19. The device of claim 18, wherein the instructions further cause the computer processor to:

responsive to eliminating the howl, increasing gain for the one or more frequencies.

20. The device of claim 15, wherein detecting presence of the howl comprises tonality detection based on the linear prediction.

* * * * *